US006695545B2

(12) United States Patent
Boston

(10) Patent No.: US 6,695,545 B2
(45) Date of Patent: Feb. 24, 2004

(54) SOIL STABILIZATION COMPOSITION

(75) Inventor: Gregory M. Boston, 412 Fullerton Ave., Newport Beach, CA (US) 92663

(73) Assignee: Gregory M. Boston, Newport Beach, CA (US)

( * ) Notice: Subject to any disclaimer, the term of this patent is extended or adjusted under 35 U.S.C. 154(b) by 0 days.

(21) Appl. No.: 09/975,363

(22) Filed: Oct. 11, 2001

(65) Prior Publication Data

US 2003/0070589 A1 Apr. 17, 2003

(51) Int. Cl.$^7$ ................................................ C09K 17/00
(52) U.S. Cl. ................................ 405/302.4; 405/302.6; 404/76; 106/719
(58) Field of Search ....................... 405/302.4, 302.6, 405/263, 264, 266, 268, 270, 15; 404/75, 76; 106/719

(56) References Cited

U.S. PATENT DOCUMENTS

| | | | |
|---|---|---|---|
| 3,950,179 A | 4/1976 | Schneider | |
| 3,959,975 A | 6/1976 | Graf | |
| 3,971,222 A | 7/1976 | Griffith, Jr. | |
| 4,001,033 A | 1/1977 | Anthone et al. | |
| 4,022,633 A | 5/1977 | Schneider | |
| 4,028,897 A | 6/1977 | Bennett | |
| 4,072,020 A | * 2/1978 | Bishop | 405/264 |
| 4,106,296 A | 8/1978 | Leonard, Jr. et al. | |
| 4,107,112 A | 8/1978 | Latta et al. | |
| 4,243,563 A | 1/1981 | Ferm | |
| 4,277,203 A | 7/1981 | Reed, Jr. et al. | |
| 4,417,992 A | * 11/1983 | Bhattacharyya et al. | 252/88.1 |
| 4,592,931 A | 6/1986 | Cargle | |
| 4,606,675 A | 8/1986 | Mitani et al. | |
| 4,799,549 A | 1/1989 | Vinot et al. | |
| 4,826,350 A | * 5/1989 | Kambe | 404/27 |
| 4,941,924 A | 7/1990 | Merritt | |
| 5,000,789 A | 3/1991 | Merritt | |
| D323,511 S | 1/1992 | Swisher, Jr. | |
| 5,181,797 A | 1/1993 | Circeo, Jr. et al. | |
| 5,219,246 A | 6/1993 | Coutts et al. | |
| 5,336,315 A | 8/1994 | Cuscurida et al. | |
| 5,364,206 A | 11/1994 | Marienfeld | |
| 5,366,022 A | 11/1994 | Meyer et al. | |
| 5,368,410 A | 11/1994 | Ferraiolo | |
| 5,415,795 A | * 5/1995 | Roe et al. | 427/212 |
| 5,567,087 A | 10/1996 | Theisen | |
| 5,746,546 A | 5/1998 | Hubbs et al. | |
| 5,770,639 A | 6/1998 | Ritter et al. | |
| 5,860,770 A | * 1/1999 | Hunt | 405/264 |
| 5,904,447 A | 5/1999 | Sutton et al. | |
| 6,071,411 A | 6/2000 | Grott | |
| 6,076,997 A | 6/2000 | First et al. | |

OTHER PUBLICATIONS

Santoni et al, "Accelerated strength Improvement of Silty Sand Using Non–traditional Additives," Aug. 1, 2002.*
Santoni et al, "Soil Sement Engineering Benefits," Aug. 1, 2001.*
Perma–Zyme 11X; "The Most Effective Way to Stabilize Roads and Seal Ponds For Less Cost!"; 4pgs, (undated).
Soil Science International, Inc.; "The Sensible Solution for Industrial Containment"; 4 pgs, (undated).
Engineerd Polymer Solutions, Inc.: "Water Reducible Resins"; 3 pgs, (undated).
Engineered Polymer Solutions, Inc.: "High Solids and Coil Polyesters"; 4 pgs, (undated).

* cited by examiner

Primary Examiner—Frederick L. Lagman
(74) Attorney, Agent, or Firm—Stetina Brunda Garred & Brucker

(57) ABSTRACT

A soil stabilization composition is provided for enhancing compaction and reducing permeability of different types of soil. The composition includes an acrylic copolymer resin, an enzyme and portland cement. The proportions of resin enzyme and cement will vary in accordance with the type of soil being treated. Sandier soils typically require higher volumes of product than sandier soils, and may require different relative compositions of ingredients.

10 Claims, No Drawings

SOIL STABILIZATION COMPOSITION

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention relates to compositions for use in unimproved earth surfaces, such as dirt roads, parking lots, reservoir surfaces, and elsewhere. More particularly, the invention relates to novel composition that function to enhance the structural integrity of unimproved surfaces, while lowering permeability, to levels compatible with those of road surfaces.

Since the Roman times improved road surfaces have been an essential element of the transportation of goods and people. Better road surfaces have enhanced the ability to bear heavier vehicles in a more dependable manner, notwithstanding variable weather conditions.

As road construction techniques improved techniques and compositions were devised for use in larger and stronger roads, enabling the delivery of goods and services to areas where they may be needed.

However, economic realities limit the ability to implement road construction techniques in many areas. For example, cost of constructing asphalt or concrete roads, including the cost of grading and forming suitable foundations are unaffordable in many less developed areas where a better transportation system is sorely needed. As a result, such areas may be serviced only by unimproved roads that may become muddy, washed out, or otherwise unusable in different seasons. In short, the advantages of contemporary construction techniques are either beyond the resources of many areas, or otherwise economically unsuitable for certain applications.

Accordingly, a need exists for soil stabilization compositions which provide improved surfaces, but do not require extensive materials and preparation techniques commonly used in contemporary road construction techniques. The need exists to maximize soil stabilization improvement for roads and other uses, within budgets that make such compositions reasonably available for areas and applications subject dramatic changes in climate and in areas where extensive road construction techniques are either not economically viable or otherwise unaffordable in view of the particular economic conditions. Soil stabilization compositions such as those described herein are suitable for not only for stabilizing and strengthening unimproved roads, but also for improving large unimproved areas such as drive ways, parking lots, drainage areas, man-made lake bottoms, and many other applications that will be well recognized to those in the construction trade.

Moreover, the compositions and techniques disclosed herein are intended to be useful in conjunction in a wide range of the soil condition that are more limiting to contemporary soil stabilization compositions.

Still further, the soil stabilization techniques and compositions disclosed herein are formulated to permit fast curing for ease of construction, pliability for use of formation, high strength and durability, all within a product designed to be economically for many types of users and applications.

BRIEF SUMMARY OF THE INVENTION

A soil stabilization composition is provided for enhancing compaction and reducing permeability of different types of soil. The composition includes an acrylic copolymer resin, an enzyme and portland cement. The proportions of resin enzyme and cement will vary in accordance with the type of soil being treated. Sandier soils typically require higher volumes of product than sandier soils, and may require different relative compositions of ingredients.

DETAILED DESCRIPTION OF THE INVENTION

As described below a soil stabilization composition is provided which incorporates quantities of enzymes, and acrylic copolymer resin and Portland cement.

The enzyme may be selected from a number of commercially available products, such as products sold under the designation Permezmell, marketed by International Enzyme of Las Vegas, Nev. Other suitable enzymes are vegetable based enzymes, formed from grapes, enzymes used in detergents and other enzymes which have wetting capability which enhance the flow of the soil stabilization composition when applied to the ground.

Acrylic copolymer resin water based product, such as the product marketed under the designation EPS 2906, marketed by Engineering Polymer Science. Such enzymes are commonly used in the manufacture of paint and have significant substantial hardening capacity, high abrasion, fast drying capability and elasticity. Such products are also relatively UV transparent to allow more even curing of the composition as it is applied to soil and flows therethrough.

The use of the acrylic copolymer resin provides substantial advantages in relation to commercially available products, such as the oil based copolymer marketed under the designation SS 13 by Brown Mudd Company. Such oil based compositions are understood to function by linking to clay in the soil, which swells in response to the presence of the oil based copolymers. While such products are effective under certain conditions, experience indicates that they are less suitable in relation to sandier soil. Moreover, when such contemporary products dry, they may become crusty and resist reactivation.

By contrast, the acrylic copolymer resin used in the present invention has been found to remain effective even in sandier soils, as found in many locations. Moreover, in combination with the other specified ingredients, the acrylic copolymer cures fast, exhibits high compaction and low permeability.

The inclusion of the portland cement in the composition has been found to increase the strength of composition, gives the composition body and promotes curing by means of endothermic reaction. Because of those characteristics, it has been found that portland cement should be added to the composition immediately prior to application, i.e., in the same day. The portland cement further helps to take moisture out of the soil, which enhances curing rate.

In one embodiment the composition is formed by adding five (5) gallons of the enzyme with fifty-five (55) gallons of the acrylic copolymer resin. To that, fifteen (15) pounds of portland cement are then added. That composition has been found to form an emulsion having approximately 60% solids.

As noted above, various formulations of the present invention may be utilized to maximize the advantages of the invention in relation to different types of soils, for example, in sandier soils the blend of the composition may be modified as follows:

| Enzyme | 10 Gallons |
|---|---|
| Acrylic Copolymer Resin | 44 Gallons |
| Portland Cement | 17 Lb. |

In fills having high clay content the enzyme provides significant stabilization, requiring less copolymer. In such soils, the formulation may be blended as follows:

| Enzyme | 5 Gallons |
|---|---|
| Acrylic Copolymer Resin | 50 Gallons |
| Portland Cement | 10 Lb. |

As one of ordinary skill in the art will recognize, concentration of the formulation in water may also be varied in response to particular conditions, such as the particular soil conditions, temperature conditions, and road surface conditions. In the typical formulation the composition is blended with water as follows:

| Enzyme | Ten (10) Gallons |
|---|---|
| Acrylic Copolymer Resin | Fifty (50) Gallons |
| Portland Cement | Fifteen (15) Pounds |
| Water | Fifteen 40% |

The water may be potable, non-potable or salt water.

As will also be recognized by one skilled in the art, techniques for applying the composition are highly significant in relation to the effectiveness of the product. Surface preparation is important to facilitate saturation of the soil to the desired depth. The shaping of the soil to the desired contour, e.g., banking or crowning of roads, is preferably undertaking while the soil is in plasticized condition after the composition has been applied, but before curing takes place. Post application compaction serves to cement the soil after it has been shaped.

The typical application process proceeds as follows. First, the area is stabilized to be free of any mulch processing material to allow for the composition to bind soil products. The composition and water are put into a water truck whereupon it may be spread for the area to be stabilized. As noted above, proportions of the composition to water depend upon factors such as the amount of moisture in the soil, climactic conditions in the type of soil.

A disk roller or other such vehicle, proceeds to fragment and break up the soil in the area to be treated. Typically the soil is fragmented to depth of six to eight inches. As the water truck applies the composition to the soil, the disk roller may make repeated passes over the area to thoroughly mix the soil stabilization composition into the soil. The process of applying the composition to the soil, and in fragmenting the soil by the disk roller typically continue simultaneously until the moisture content of the soil in the area to be treated reaches an optimum level. Typically, a sample of the treated soil may be gathered by hand and formed into a firm ball without disintegrating or exuding any excess moisture.

A motor grader, or similar mechanism, may be used to shape the treated area and to meet engineering specifications, e.g., crowning, sloping, etc. This prepares the area for compaction. The treated soil is then compacted with a device such as a 12 ton, double drum, vibratory roller. In some cases the rolling compaction phase may be preceded by a sheeps foot to achieve higher compacted density.

The treated area is preferably left undisturbed for approximately 72 hours to allow for curing to a depth of 6 inches.

Soil so treated with the composition, applied as described, has been found to exhibit high load bearing capacity, low permeability compatibility with a multitude of climates in weather. The composition has been found to lower the surface tension of water as applied, to promote fast and thorough penetration and dispersal of moisture. This wetting action allows hydrated fine particles to be compacted closer and eliminates voids throughout the road base material, forming a tight, dense permanent stratum. Water content of the treated soil may typically be in the range of 8%–13%. Moreover, the characteristics of a surface so treated by sufficiently favorable to eliminate the need for importing aggregate or other materials traditionally used in roads and road foundations. Composition may also be maintained in concentrated form, easing storage transportation requirements.

The soil stabilization compound of the present invention works on a variety of different types of soil. The composition includes a resin based polymer effective to form a long chain polymer that coats and binds different types of soil products, from sand to clay. This is unlike prior oil based polymers which may only work with clay. Moreover, the presence of the enzyme provides a plasticity, or memory, to the composition, which enhances the absorbability of the soil (takes friction out of the water), and provides a plasticity, or memory, to the composition. That plasticity enhances the wearability of the composition.

Coverage with the composition is typically in the range of 660 gallons per acre, or approximately 60 square feet per gallon. In some applications, such as trails, more product may be used, e.g., 30 square feet a gallon. For other applications, such as erosion control, less product may be used, e.g., 300 square feet per gallon. As noted above, generally more the composition is used where the soil is sandy, unless where the soil is clay.

The invention also has application to the types of surfaces, including not only roads, but other load supporting areas such as reservoir bottoms, parking surfaces or other areas where the unimproved natural conditions are unsuitable for intended use. These and other applications will be recognized by those of ordinary skill in the art as advantageous applications of the present invention.

What is claimed is:

1. A soil stabilization composition for application to a soil comprising:
    an enzyme;
    an acrylic copolymer resin; and
    a curing and strengthening agent for enhancing cure rate and strenthening the resulting composition.

2. The soil stabilization composition as recited in claim 1, wherein the acrylic copolymer resin is formed of a ring copolymer.

3. The soil stabilization composition as recited in claim 1 wherein the curing and strengthening agent comprises portland cement.

4. The soil stabilization composition as recited in claim 3 wherein the acrylic copolymer resin is U-V transparent, to facilitate curability of the composition when applied.

5. The soil stabilization composition as recited in claim 4 wherein the acrylic copolymer resin forms a long chain polymer upon application to soil particles.

6. The soil stabilization composition as recited in claim 4 wherein the enzyme provides plasticity characteristics to the composition.

7. The soil stabilization composition as recited in claim 4 wherein the enzyme is formed as a vegetable based enzyme.

8. The soil stabilization composition of claim 7 wherein the enzyme changes wetability of the soil.

9. The soil stabilization composition as recited in claim 7 wherein the enzyme is sugar-free.

10. The soil stabilization composition as recited in claim 4 wherein the enzyme/copolymer are combined in ratio of 1:11.

\* \* \* \* \*